United States Patent [19]

Stedman

[11] 4,090,579
[45] May 23, 1978

[54] INDUSTRIAL TRUCK HAVING A PIVOTAL HOOD AND COUNTERWEIGHT ASSEMBLY

[75] Inventor: Robert N. Stedman, Chillicothe, Ill.

[73] Assignee: Caterpillar Tractor Co., Peoria, Ill.

[21] Appl. No.: 793,212

[22] Filed: May 2, 1977

[51] Int. Cl.² .......................................... B62D 25/12
[52] U.S. Cl. .................................. 180/69 R; 280/759
[58] Field of Search ............... 280/759, 43.12; 212/48, 212/49; 180/69 R, 69 L

[56] References Cited

U.S. PATENT DOCUMENTS

| | | | |
|---|---|---|---|
| 2,256,314 | 9/1941 | Dunham | 280/759 X |
| 2,931,452 | 4/1960 | Mackie | 180/69 C |
| 3,367,441 | 2/1968 | Schuster et al. | 280/759 X |
| 3,765,500 | 10/1973 | Reeves | 180/69 R X |
| 4,037,682 | 7/1977 | Sandrock et al. | 180/69 R |

Primary Examiner—Joseph F. Peters, Jr.
Assistant Examiner—Norman L. Stack, Jr.
Attorney, Agent, or Firm—John W. Grant

[57] ABSTRACT

An industrial truck has a hood normally seated on the mid portion of a frame. A counterweight has a first portion positioned adjacent a first portion of the hood and connected to the hood. A second portion of the counterweight is positioned adjacent and pivotally connected to the frame end portion for pivotal movement of the counterweight and the hood in unison and relative to the frame between a first position at which the hood is seated on the frame and a second position at which the hood is spaced from the frame. A fluid jack has first and second elements movable relative to each other with the first element being pivotally anchored to the frame end portion and the second element being pivotally connected to the counterweight. The fluid jack is of a construction sufficient for pivoting the counterweight and hood between the first and second positions.

4 Claims, 2 Drawing Figures

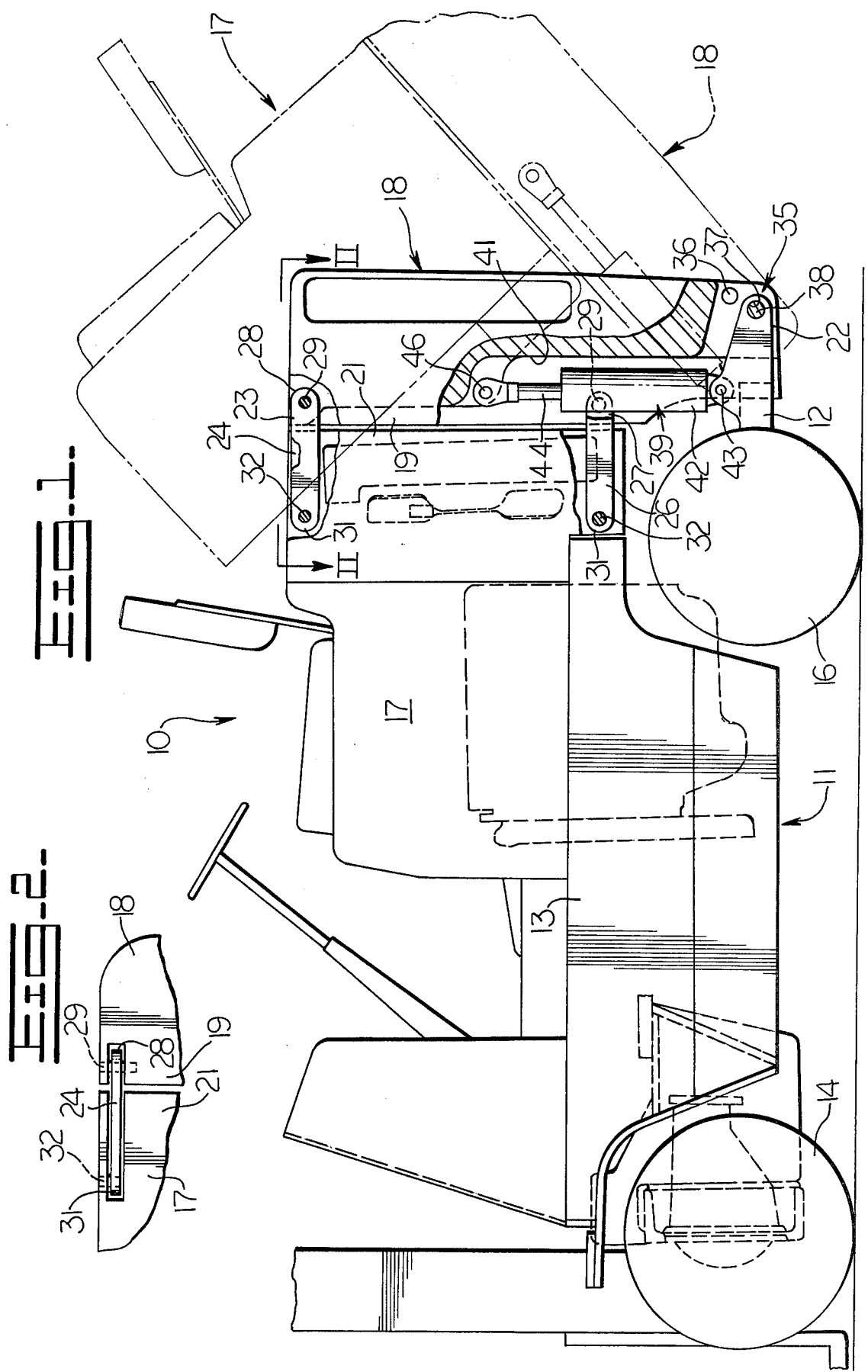

INDUSTRIAL TRUCK HAVING A PIVOTAL HOOD AND COUNTERWEIGHT ASSEMBLY

BACKGROUND OF THE INVENTION

Many industrial vehicles such as lift trucks have a hood enclosing the engine. The hood hampers access to and servicing of the engine and one of the problems has been that of mounting the hood in a manner so that it can be readily moved out of the way in order to gain easy access to the engine. This problem is compounded on those lift trucks having a counterweight mounted to the rearward end for counterbalancing the load carried on the forks at the forward end.

SUMMARY OF THE INVENTION

The present invention is directed to overcoming one or more of the problems as set forth above.

According to the present invention, an industrial truck comprises a frame having an end portion and a mid portion, a hood having a first portion and being normally seated on the mid portion of the frame, and a counterweight having a first portion positioned adjacent the first portion of the hood and a second portion positioned adjacent the forward end portion, said counterweight being connected to the hood. A device is provided for pivotally connecting the counterweight to the frame end portion for pivotal movement of the counterweight and the hood in unison and relative to the frame between a first position at which the hood is seated on the frame and a second position at which the hood is spaced from the frame. A fluid jack has first and second elements movable relative to each other with the first element being pivotally anchored to the frame end portion and said second element being pivotally connected to the counterweight. The fluid jack is of a construction sufficient for pivoting the counterweight and hood between the first and second positions.

BRIEF DESCRIPTION OF THE DRAWINGS

FIG. 1 is a diagrammatic side elevational view in partial section of an industrial truck having the apparatus of this invention with certain elements being illustrated by broken lines in an alternate position; and FIG. 2 is a view taken along line II—II of FIG. 1.

DETAILED DESCRIPTION

Referring now to FIG. 1 of the drawings, a vehicle, preferably an industrial truck, is generally indicated by the reference numeral 10. The truck includes a frame 11 having a rearward end portion 12 and a mid portion 13, the frame being suitably mounted on front and rear wheels 14, 16, respectively. The rearward end portion 12 extends rearwardly beyond the rear wheels 16. A hood assembly 17 is seated on the mid portion 13 of the frame and is suitably releasably connected to the frame in the usual manner.

A counterweight 18 has a first portion 19 positioned adjacent an end portion 21 of the hood assembly 17 and a second lower portion 22 positioned adjacent the frame end portion 12. The counterweight is connected to the hood assembly through first and second pairs of links 23, 24 and 26, 27. Each of the links has a rearward end portion 28 pivotally connected to the counterweight by a pivot pin 29 and a forward end portion 31 pivotally connected to the hood assembly by a pivot pin 32. The links 26, 27 are spaced below the respective links 23, 24 and it will be seen from the drawing that the arrangement of these links constitute a parallelogram linkage assembly.

A means 35 is provided for pivotally connecting the counterweight 18 to the rearward end portion 12 of the frame 11 so that the counterweight and hence the hood assembly 17 can be pivoted in unison relative to the frame between a first position at which the hood is seated on the frame as shown in solid lines and a second position at which the hood is spaced from the frame as illustrated by the broken lines. Means 35 can be, for example, a laterally extending bore 36 formed in the counterweight, a bore 37 formed in the rearward end portion 12 of the frame and a pin 38 inserted into the bores 36 and 37.

A fluid jack 39 is positioned within a recess 41 formed in the counterweight 18 and has a cylinder 42 pivotally anchored to the rearward end portion 12 at a pivot 43 positioned forward of the bore 37. A piston rod 44 is movable relative to the cylinder and is pivotally connected to the counterweight at a pivot 46. The jack is of a construction sufficient for pivoting the counterweight and hood assembly between the first and second positions.

In operation, the counterweight 18 is normally carried by the fluid jack 39 in the position shown by solid lines. To prepare the truck for moving the hood assembly 17 and counterweight to the second position, the piston rod 44 of the fluid jack 39 is retracted thereby lowering the counterweight 18 relative to the hood assembly. The counterweight will travel in an arcuate pathway about the pins 32 and the bore 36 will eventually be positioned in alignment with the bore 37. The pin 38 is then inserted into the bores 36 and 37 forming a pivotal connection between the counterweight and the rearward end portion 12 of the frame. The means releasably connecting the hood assembly to the frame are then released. Finally, the piston rod 44 of the fluid jack 39 is extended causing the counterweight to pivot about the pin 38. By virtue of the hood assembly being connected to the counterweight, it is also pivoted in unison with the counterweight about the pin 38 to the second position. At the second position, the hood is spaced from the frame so that the engine and related components are readily accessible.

To return the hood assembly 17 and counterweight 18 to the first position, the above sequence of events are reversed.

Other aspects, objects and advantages of this invention can be obtained from a study of the drawings, the disclosure and the appended claims.

THE EMBODIMENTS OF THE INVENTION IN WHICH AN EXCLUSIVE PROPERTY OR PRIVILEGE IS CLAIMED ARE DEFINED AS FOLLOWS:

1. An industrial truck comprising:
   a frame having an end portion and a mid portion;
   a hood having a first portion and being normally seated on the mid portion of the frame;
   a counterweight having a first portion positioned adjacent the first portion of the hood and a second portion positioned adjacent the frame end portion, said counterweight being connected to the hood;
   means for pivotally connecting the counterweight to the frame end portion for pivotal movement of the counterweight and the hood in unison and relative to the frame between a first position at which the hood is seated on the frame and a second position at which the hood is spaced from the frame; and a fluid jack having first and second elements movable relative to each other, said first element being pivotally anchored to the frame end portion and said second element being pivotally connected to the counterweight, said fluid jack being of a construction sufficient for pivoting the counterweight and hood between the first and second positions.

2. The truck of claim 1 wherein said means includes a first bore formed in the counterweight, a second bore formed in the frame end portion and being positioned in alignment with the first bore, and a pin inserted into the first and second bores.

3. The truck of claim 2 including a recess formed in said first portion of the counterweight, said fluid jack being positioned within the recess.

4. The truck of claim 3 including a plurality of connecting links each having first and second end portions, said first end portions being pivotally connected to the counterweight and said second end portions being pivotally connected to the hood.

* * * * *